US 8,219,434 B2

(12) United States Patent
Beringer

(10) Patent No.: US 8,219,434 B2
(45) Date of Patent: Jul. 10, 2012

(54) AD-HOC COORDINATION ACTIONS IN BUSINESS PROCESSES

(75) Inventor: Joerg Beringer, Frankfurt (DE)

(73) Assignee: SAP AG, Walldorf (DE)

( * ) Notice: Subject to any disclaimer, the term of this patent is extended or adjusted under 35 U.S.C. 154(b) by 1533 days.

(21) Appl. No.: 11/184,728

(22) Filed: Jul. 19, 2005

(65) Prior Publication Data

US 2006/0015382 A1    Jan. 19, 2006

(30) Foreign Application Priority Data

Jul. 19, 2004    (EP) .................................... 04017028

(51) Int. Cl.
*G06Q 10/00*    (2012.01)
(52) U.S. Cl. ...................................... 705/7.15; 705/345
(58) Field of Classification Search ......................... None
See application file for complete search history.

(56) References Cited

U.S. PATENT DOCUMENTS

| | | | | |
|---|---|---|---|---|
| 6,338,087 B1 * | 1/2002 | Okanoue | ...................... | 709/222 |
| 6,507,845 B1 * | 1/2003 | Cohen et al. | .................. | 707/608 |
| 6,912,657 B2 * | 6/2005 | Gehrmann | .................... | 713/171 |
| 7,009,943 B2 * | 3/2006 | O'Neil | .......................... | 370/260 |
| 7,031,279 B2 * | 4/2006 | Lee et al. | ...................... | 370/331 |
| 7,120,667 B2 * | 10/2006 | Derocher et al. | ............. | 709/204 |
| 2004/0148214 A1 * | 7/2004 | Aziz et al. | ......................... | 705/8 |
| 2005/0033626 A1 * | 2/2005 | Kruse et al. | ....................... | 705/9 |
| 2005/0141706 A1 * | 6/2005 | Regli et al. | ...................... | 380/44 |
| 2005/0147112 A1 * | 7/2005 | Sugaya | ......................... | 370/418 |
| 2007/0133439 A1 * | 6/2007 | Promenzio et al. | ........... | 370/261 |

OTHER PUBLICATIONS

Hwang et al., "Mining exception instances to facilitate workflow exception handling", IEEE, Jun. 1999.*
Hwang et al., "Consulting past exceptions to facilitate workflow exception handling," Decision support system 37 (2004) pp. 49-69.*
Hagen et al., "Exception handling in workflow management systems," IEEE transactions on softwrae engineering, vol. 26, No. 10, Oct. 2000.*

* cited by examiner

*Primary Examiner* — Jonathan G Sterrett
*Assistant Examiner* — Tzu-Hsiang Lan
(74) *Attorney, Agent, or Firm* — Buckley, Maschoff & Talwalkar LLC

(57) ABSTRACT

Methods and apparatus, including computer program products, for ad hoc coordination actions in business processes. A computer-implemented method for implementing an ad-hoc coordination action framework, extending on a business process framework, includes enabling ad-hoc coordination actions as generic callable services in a work context, implementing the ad-hoc actions as templates defining state transitions between roles participating at the work context, and enabling the work context to track state transitions as a conversation thread.

19 Claims, 7 Drawing Sheets

| Generic Acts | Requester | Supplier | Expert | Assistent | Approver |
|---|---|---|---|---|---|
| Request | | | | | |
| Clarification | | | | | |
| Endorsement | | | | | |
| Negotiation | | | | | |
| Promise | | | | | |
| Delegation | | | | | |
| Escalation | | | | | |
| Report | | | | | |
| Confirmation | | | | | |
| Declare | | | | | |

Fig. 5

AD-HOC COORDINATION ACTIONS IN BUSINESS PROCESSES

CROSS REFERENCE TO RELATED APPLICATIONS

This application claims the benefit from EP 04017028.4, filed on Jul. 19, 2004, the entire contents of which is incorporated herein by reference.

BACKGROUND

The present invention relates to data processing by digital computer, and more particularly to ad hoc coordination actions in business processes.

Business applications aid users of the applications performing their activities within an enterprise. For example, a business application may guide a user through steps of a certain business process in a certain order, e.g. hiring a new employee. A business application uses a number of services. For different steps in this process, the business application may then provide the user with one or more services at the user interface, such as filling in and submitting a form to a database (e.g. with the new employee's name, address, and so forth), and ordering items (e.g. a workplace for the new employee).

Typically, a service is implemented as a set of procedures or functions hosted on a computer server connected to computer devices.

Business process models cover the way business is done formally, without considering informal processes, or more work group-oriented work procedures that evolve as best practice of how to actually run the business. Besides dynamic workflows that may be adjustable to ad-hoc constraints or needs at runtime, there exists a level of ad-hoc people-to-people coordination on top of a process that manages the process on a meta level, solve problems, evaluate deliverables, and so forth. This ad-hoc coordination is typically done outside of the system using generic communication tools like email or phone. Such ad-hoc actions are neither trackable nor directly supported within the context of the business application.

SUMMARY

The present invention provides methods and apparatus, including computer program products, for ad hoc coordination actions in business processes.

In general, in one aspect, the invention features a computer-implemented method for implementing an ad-hoc coordination action framework, extending on a business process framework, the method including enabling ad-hoc coordination actions as generic callable services in a work context, implementing the ad-hoc actions as templates defining state transitions between roles participating at the work context, and enabling the work context to track state transitions as a conversation thread.

In embodiments, the ad-hoc action framework can be enabled as an additional layer in a business application. The method can include tracking the conversation thread in real time. The method can include modeling the ad-hoc actions on a basis of one or more state transitions between one or more participants in the one or more actions and persisting the ad-hoc actions between the one or more participants in the work context, wherein the ad-hoc actions can be enabled in a conversation between the one or more participants. The method can include instantiating an ad-hoc conversation including one or more ad-hoc actions between one or more participants within the work context.

In embodiments, at least one of the ad-hoc actions can be at least one of a generic ad-hoc action and an action specific ad-hoc action. At least one of the ad-hoc actions can be a definition of a coordination action between participants, wherein the coordination action has a particular type. At least one of the ad-hoc actions can be modeled on a state transition model including substantially all state transitions for the particular type of coordination action. The method can include encapsulating the state transition models as long-running actions on a business application and instantiating the long-running actions within an instantiated context of a business application.

The method can include, when launching the long-running actions, combining the long-running actions with an existing contextual role. The method can include, when launching the long-running actions, adding a new participant to the instantiated context.

The method can include pre-enabling a combination of at least one of the ad-hoc actions with a particular instantiated context in accordance with a common work practice. The ad-hoc actions can include a definition of at least one a request action, a promise action and a negotiate action.

The additional layer can be modeled by ad-hoc coordination actions on the basis of one or more state transitions models that define the ad-hoc interaction among participants in a given context.

The execution of one or more of the ad-hoc actions can freeze a work flow instance in the business process framework.

The invention can be implemented to realize one or more of the following advantages.

The method combines a concept of state-transition patterns with a concept of work context. A set of archetypical ad hoc coordination actions is enabled by state transition models that define all possible state transitions for this type of coordination act. The state transition models are encapsulated as long-running actions that can be instantiated within a current work context. When launching such actions they can be combined with existing contextual roles or may be added as a new participant to the context (output). Combinations of ad hoc actions and context/process roles can be pre-enabled to reflect common work practice, e.g., negotiate with a supplier, clarify requirements with a requester, and so forth.

One implementation of the invention provides all of the above advantages.

Other features and advantages of the invention are apparent from the following description, and from the claims.

BRIEF DESCRIPTION OF THE DRAWINGS

FIG. 5 lists the candidates for ad-hoc coordination actions derived from the act-speech diagram shown in FIG. 4.

Like reference numbers and designations in the various drawings indicate like

DETAILED DESCRIPTION

Figure 1:
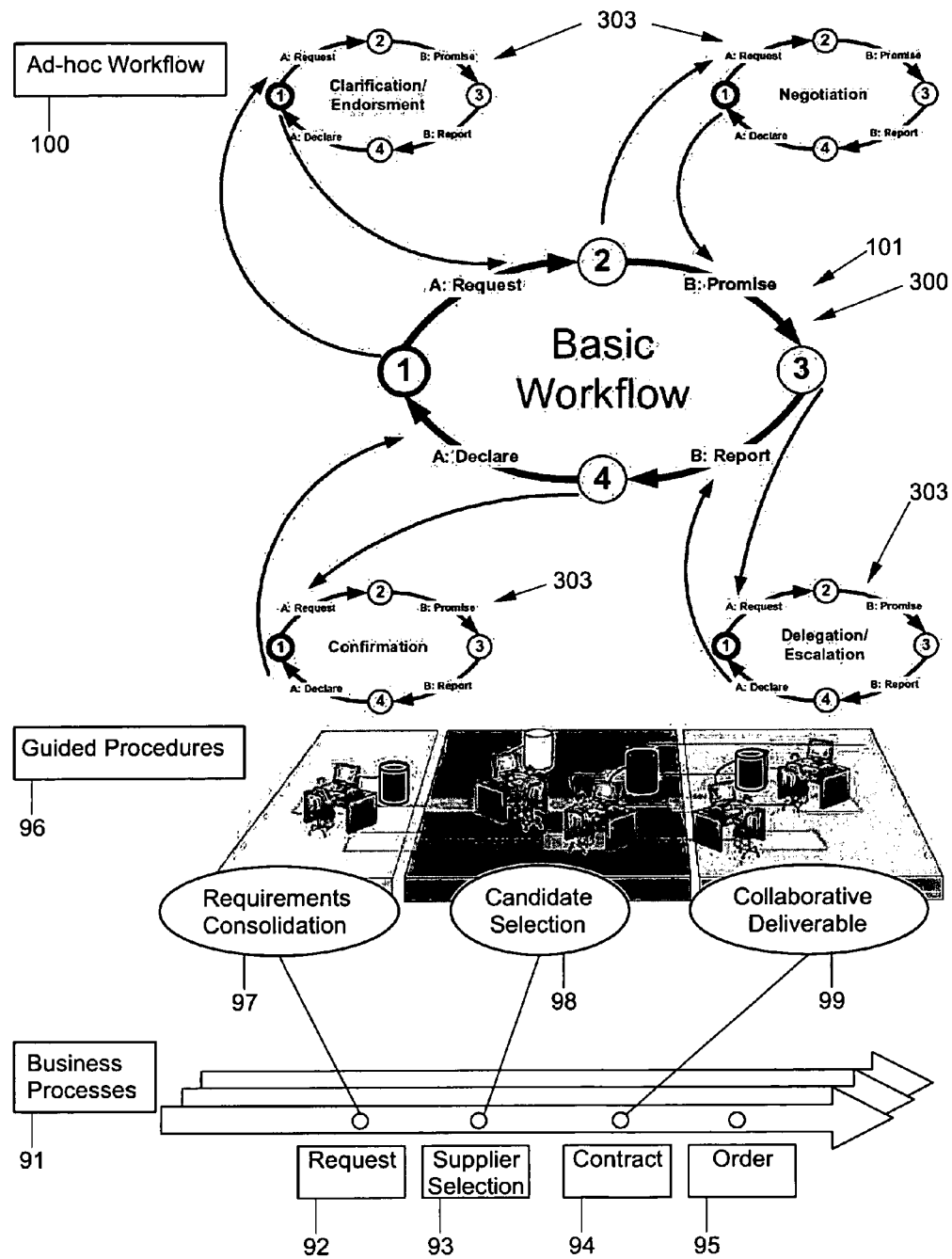
FIG. 1 is a diagram illustrating a business process, a guided procedure and an ad-hoc workflow.

FIG. 1 illustrates a business process, a guided procedure and an ad-hoc workflow. In particular, FIG. 1 illustrates a business process having a business process framework 91, having a request 92, a supplier selection 93, a contract 94 and an order 95. The business processes are hardwired in the system. Guided procedures 96 are provided to carry out the business processes. Guided procedures include dynamic work flow, as illustrated by the circles 79, 98, 99. Out of this formal business workflow, several informal and more work-group-oriented ad-hoc processes may arise. The ad-hoc workflow having an ad-hoc coordination action framework 100, which forms an additional layer that is disposed on top of the guided procedures. In particular, the ad-hoc coordination action framework 100 extends on the business process framework 91. In the example shown, the guided procedures include a requirements consolidation 97 that deals with the request 92, a candidate selection 98 that deals with the supplier selection 93 and a collaborative deliverable 99 that deals with the contract 94. Within each of the dynamic workflows, a need for ad-hoc coordination arises, which includes ad-hoc conversations with participants of a particular respective workflow context. Such coordination is handled by the ad-hoc coordination actions, which are executed on top of the basic dynamic workflow 101 and include the execution of standard coordination actions 303. An additional (third) layer is provided on top of the collaborative workflow, such as candidate selection and so forth. Such workflows are already more dynamic and sensitive to exceptions, such as approval and rejection, than fixed business workflow. They do not necessarily cover the actual exchanges, such as conversations and email, between participants due to exceptions, such as lacking information and different opinions, and so forth. The exchanges, such as conversations, serve a particular purpose, for example, request and clarification, and can be modeled by means of ad-hoc coordination actions in the form of state-action transitions patterns and related user interfaces. In particular, ad-hoc actions may be enabled by state transition models between roles participating at the work context. Further, the ad-hoc coordination actions may be implemented as generically callable actions in the work context. In this way, ad-hoc actions are available and executable without affecting or redefining the process model at the dynamic workflow level. In particular, the ad-hoc coordination actions may be implemented as state transition templates or models between roles participating at the work context. Further, the state transitions may be tracked as a conversation thread in the work context. It is noted, that on the one hand, there exists a dynamic workflow level that also includes business actions and perhaps, some collaborative actions, and on the other hand, there exists the particular class of ad-hoc coordination actions, which link two or more roles in a given dynamic workflow context into an ad-hoc (meta) conversation about the business situation. According to one embodiment of the invention, running ad-hoc coordination actions are being related to participants in a context. In this way, the callable actions relating to roles can be tracked as a conversation within the business process. For example, as part of a model, it may be possible that a supplier has a request for clarification. Any role can have active coordination acts. Ad-hoc workflow which does not fall under the predefined exceptions may also be covered and tracked.

In particular, in a business process, informal work groups may progress a business process. In particular, informal work groups contribute to the ad-hoc work flow 100. A business process 91 may include receiving an invoice, getting approval to pay, sending the invoice to the accounting department, sending the invoice to the payment department and sending the invoice to the mail room. The system's design including the guided procedures for the system requires input/output and communication links with a variety of participants who may be part of the human process carried out by the informal group. For example, the human process for carrying out the business process 91 may include a secretary who asks for approval for the invoice from a manager. This part of the procedure requires an escalating action. The invoice is then sent to the accounting department, where further participants are involved. In the pay department, a further participant is involved, and finally the postman who delivers the payment.

In order to provide a guided procedure that can deal with the ad-hoc activity that arises as a result of informal work, the patterns in the informal work are identified. This is achieved by deriving an action definition for the actions involved in the informal work by modeling the state transitions for the information exchange between the participants. Dealing with ad-hoc work flow may also be referred to as exception handling. Further, the actions involved in the ad-hoc (or informal) work flow may also be referred to as exceptions. Exception handling may be implemented in the guided procedure in the following way: actions implement the core functionality of an agent (execution role). They include a specific internal exception handling for internal purposes. They may give rise to predefined exceptions to their environment and deliver status information (detect exception), support diagnosis of exception (state information and introspection, modeling standard behavior, suggestion of possible causes), and offer exception handling capabilities. They may offer generalized exception handling support (retry, rollback, pause), as well as action specific support which helps to build context sensitive exception handling strategies mapped to possible detect/reason patterns. In the guided procedure implementation, the propagation of exceptions may be controlled in a generic way or by enhancing the guided procedure template design functionality. The execution of one or more of the ad-hoc actions freezes a work flow instance in the business process framework. In this way, although ad-hoc actions sit on top of the workflow framework and are independent, they may still cause a freeze (or a hold) of the dynamic workflow. In other words, an ad-hoc coordination may or may not cause a freeze of the underlying workflow instance. Further, it may cause a step to be incomplete as long as conversations are running. In this way, it may be regarded as a generic pre-condition for steps in a workflow definition. Thus, running ad-hoc conversations may impact the workflow by freezing it or making steps incomplete.

Figure 2:
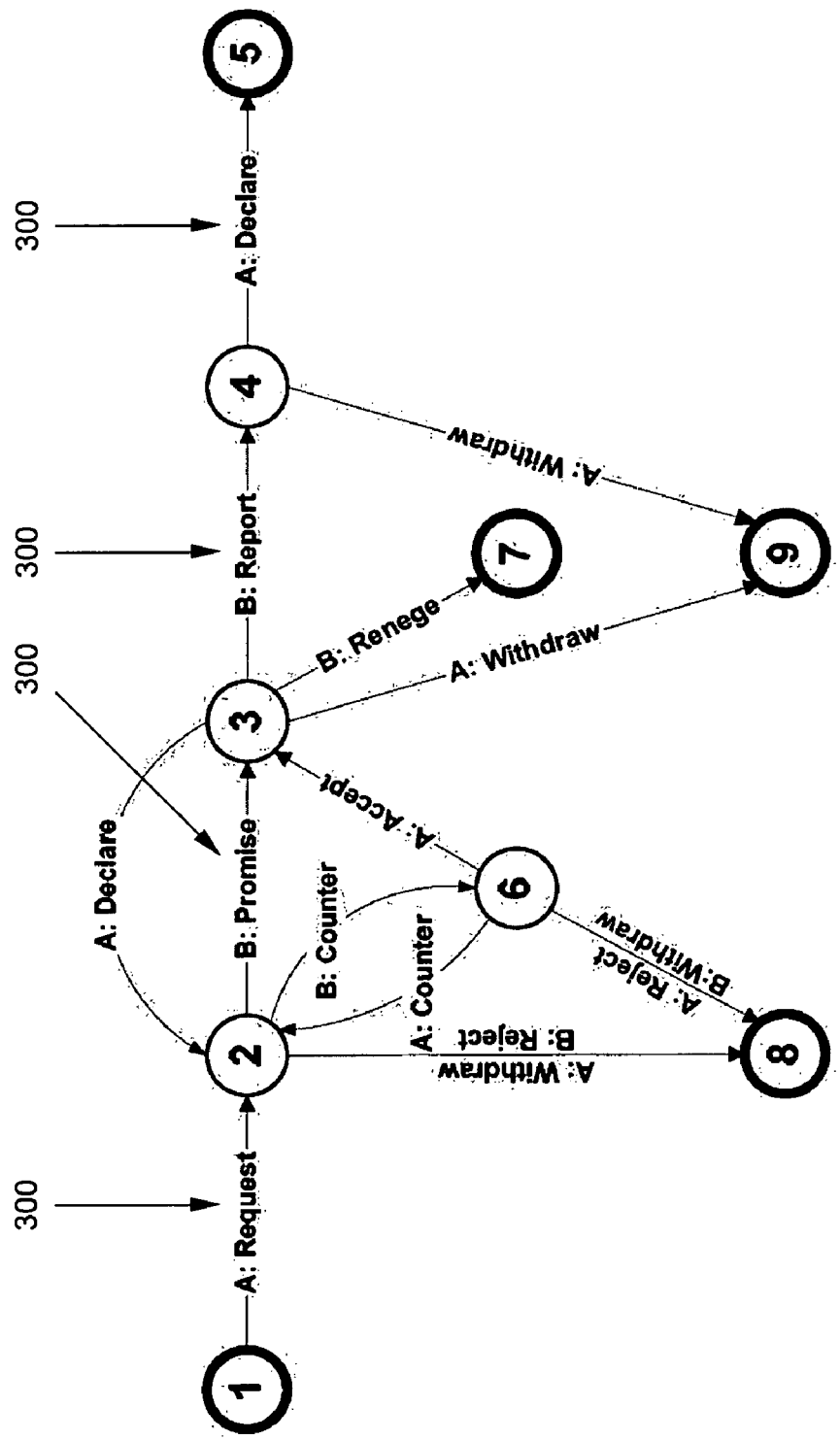
FIG. 2 is a diagram illustrating the state transitions between two participants in a guided procedure.

FIG. 2 illustrates the state transitions between two participants in a guided procedure including a plurality of actions. In particular, FIG. 2 shows an interpersonal exception handling mechanism embedded in the guided procedure framework. The exception handling mechanism is derived by analyzing interpersonal exception handling mechanisms using a speech-act approach. The model shows the interplay between the requests and answers in a conversation between an initial speaker A and an initial listener B. The states are indicated as circles. The state transitions are indicated by the arrows linking the states. To identify each state a number has been allocated to it. The model assumes that the conversations follow the state-transition diagram depicted in FIG. 2. Thus, at each step of the conversation there is only a limited set of possible types of actions 300, such as request, promise report declare, withdraw, reject, counter, accept and renege. Furthermore, each conversational step transforms the conversation into a different state, some of which end the conversation. Note that the "normal" conversation transforms conversation from the state (1) to state (5), which is a terminal state (shown through its thick boundaries). Conversations can also take a different avenues to the goal state (5), for example, 1 to 2 to 3 to 2 to 6 to 3 to 4 to 5, or even end without reaching an end where the initial request is fulfilled, such as (8) or (9), where the request is withdrawn or rejected, (7), where B reneges its fulfillment.

Figure 3:
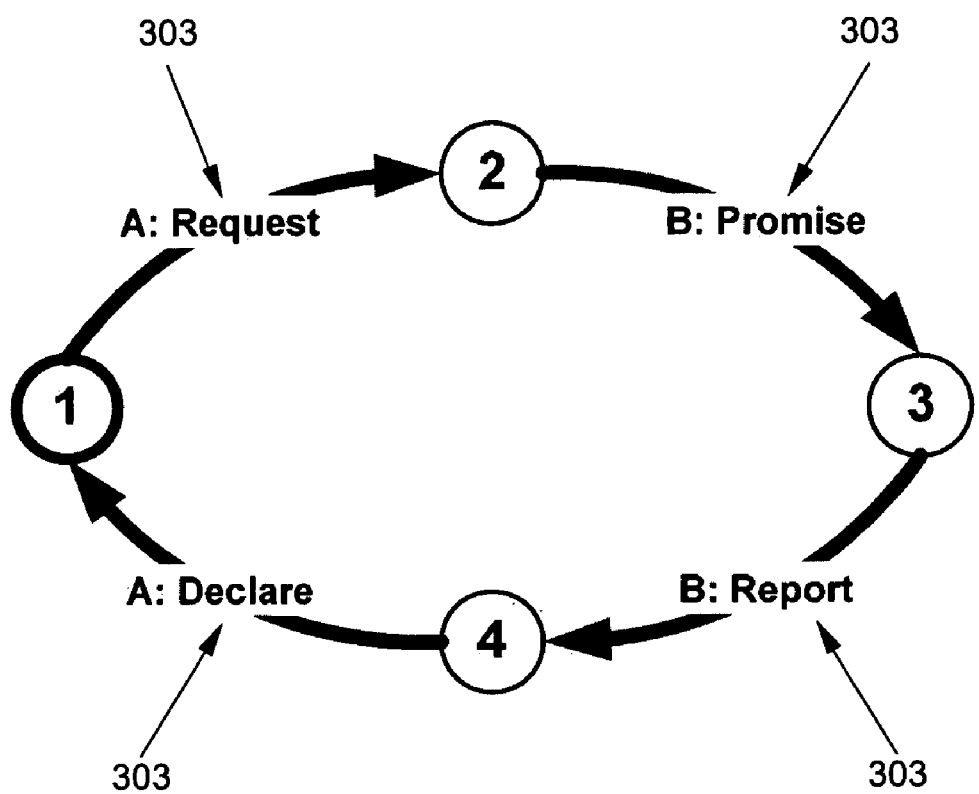
FIG. 3 is a diagram illustrating a state transition diagram for a sub-work flow.

FIG. 3 illustrates a state transition diagram for a sub-work flow. Participants A and B are involved in a procedure including actions. The actions 303 include a request action, a promise action, a report action and a declare action.

Figure 4:
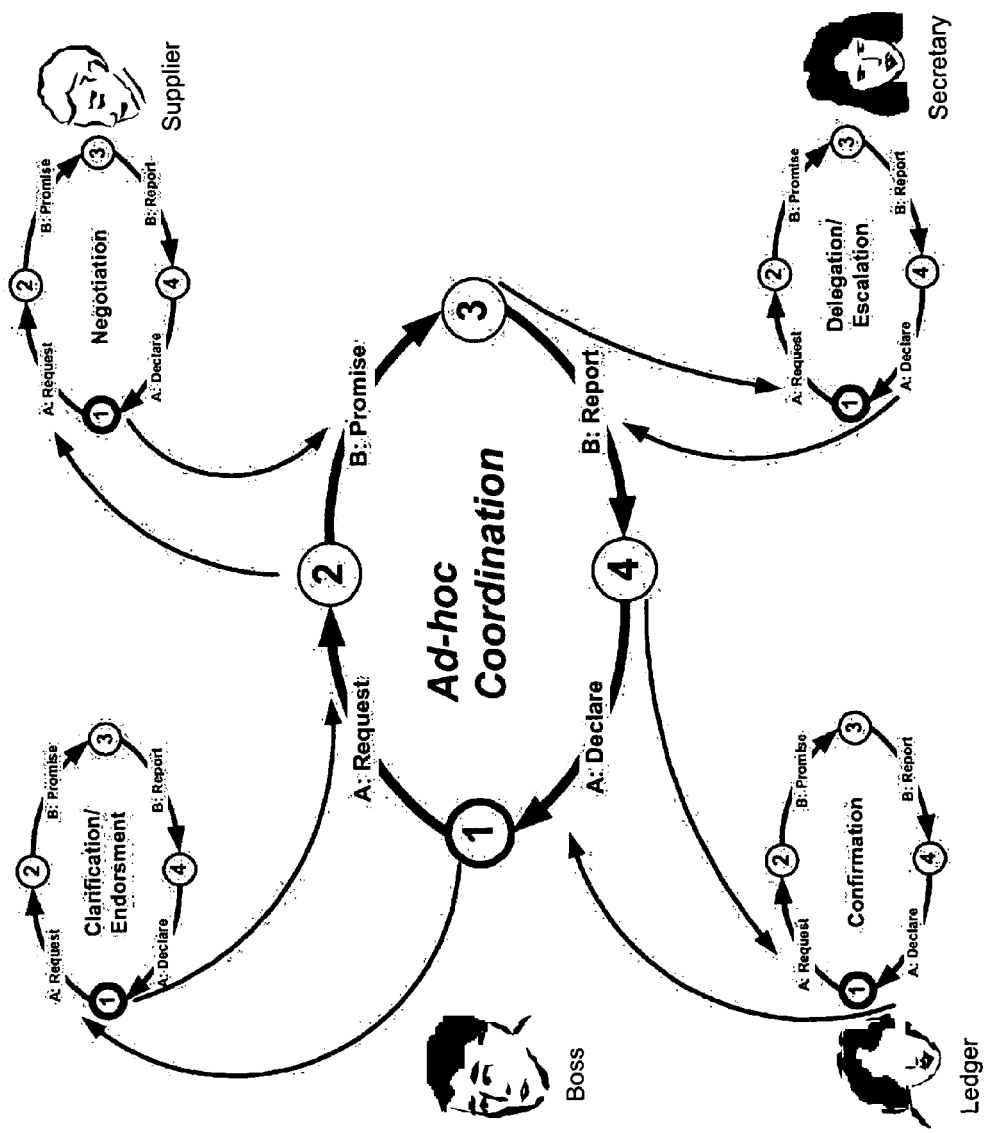
FIG. 4 is a diagram illustrating a further state transition diagram for an action work flow model with sub-work flows, including the ad-hoc work flow of FIG. 1.

FIG. 4 illustrates a further state transition diagram for an action work flow model with sub-work flows, including the ad-hoc work flow of FIG. 1. FIG. 4 shows how an ad-hoc work flow can be modeled using state transitions. It has been found that the modeling of state transitions to derive an action definition is a useful analytically within the guided procedure framework. For example, it may be used to analyze the completeness of the general interpersonal exception handling mechanisms provided by one checking them against speech-act like interaction protocols, for example, like the one shown in FIG. 4, or by identifying the additional exceptions that may occur according to the state-transition diagram shown in FIG. 2. In the example shown in FIG. 4, there are four participants, a manager, a secretary, a supplier and a ledger. In the example shown, each action includes only two of the participants A, B. In one action, the manager may be participant A, while in a further action, one of the other participants may be participant A. The designation of the participant depends on the action. In particular, the following generic actions: request, clarification, endorsement, negotiation, promise, delegation, escalation, report, confirmation and declare are supported for process roles including, but not limited to requester, supplier, expert, assistant, approver.

With reference to FIG. 2, the guided procedure includes the following non-exhaustive interpersonal exception handlers (system specific generic actions):

1. Request for approval: a generic accept/reject action providing the former steps deliverables for decision making.
2. Delegation: delegate one work item to someone else, keep trace of the delegation.
3. Escalation: escalate to another person.
4. Negotiate due date.
5. Request for contribution: generic action for asking for information.

Each of these interpersonal exception handlers may be seen as a speech-act type conversation within a guided procedure. A "request for approval", for example, is a standard request in the speech-act sense. The approval can be granted, ending the conversation in state (5) or rejected ending the conversation in state (8). It is interesting to note that a range of possible outcomes in the conversation are identified that are not straight forward deductions from the "Request for approval" exception. A request for approval may, for example, prompt a questioning of the reasoning behind the request by the receiver B (labeled as "B:counter" from state (2) to state (6) in FIG. 2). The requester A may then react by withdrawing his original request or countering the argument made by B, continuing the conversation. It should be noted that the example given in FIG. 3 is not a full analysis of the "request for approval". interpersonal exception. Nevertheless it shows how such an analysis may be conducted to model the state transitions to derive the action definition, and how such an analysis may be extended to the other exception types (system specific generic actions) as well.

This approach has further advantages. Firstly, it provides users of the guided procedure framework with a conversational context when engaging in interpersonal exception handling. It may further help other users to understand the status of the exception handling when they see the conversational status. Secondly, it provides a basis which may be applied more broadly to exception handling. For example, it may be applied to other requests that may typically arise in a daily business activity besides the ones described above. For example, a request to reserve a resource, such as a: meeting room, for a particular purpose. Another type of exception may arise through the incompatibility of a resource with the requirement. This may raise a request for definition of the goal, for example, by relaxing the requested education of a person to be hired, and so forth.

FIG. 5 lists the candidates for ad-hoc coordination actions derived from the act-speech diagram shown in FIG. 4. As described above, an ad-hoc coordination action links two or more roles in a context into an ad-hoc (meta) conversation about the business situation. In particular, FIG. 5 shows generic acts, listed in a the first column, including coordination actions 303. The actions include, but are not limited to, request, clarification, endorsement, negotiation, promise, delegation, escalation, report, confirmation and declare. The participants 109-113 are listed in the first row, including, but are not limited to, Requester, Supplier, Expert, Assistant, and Approver.

Figure 6:
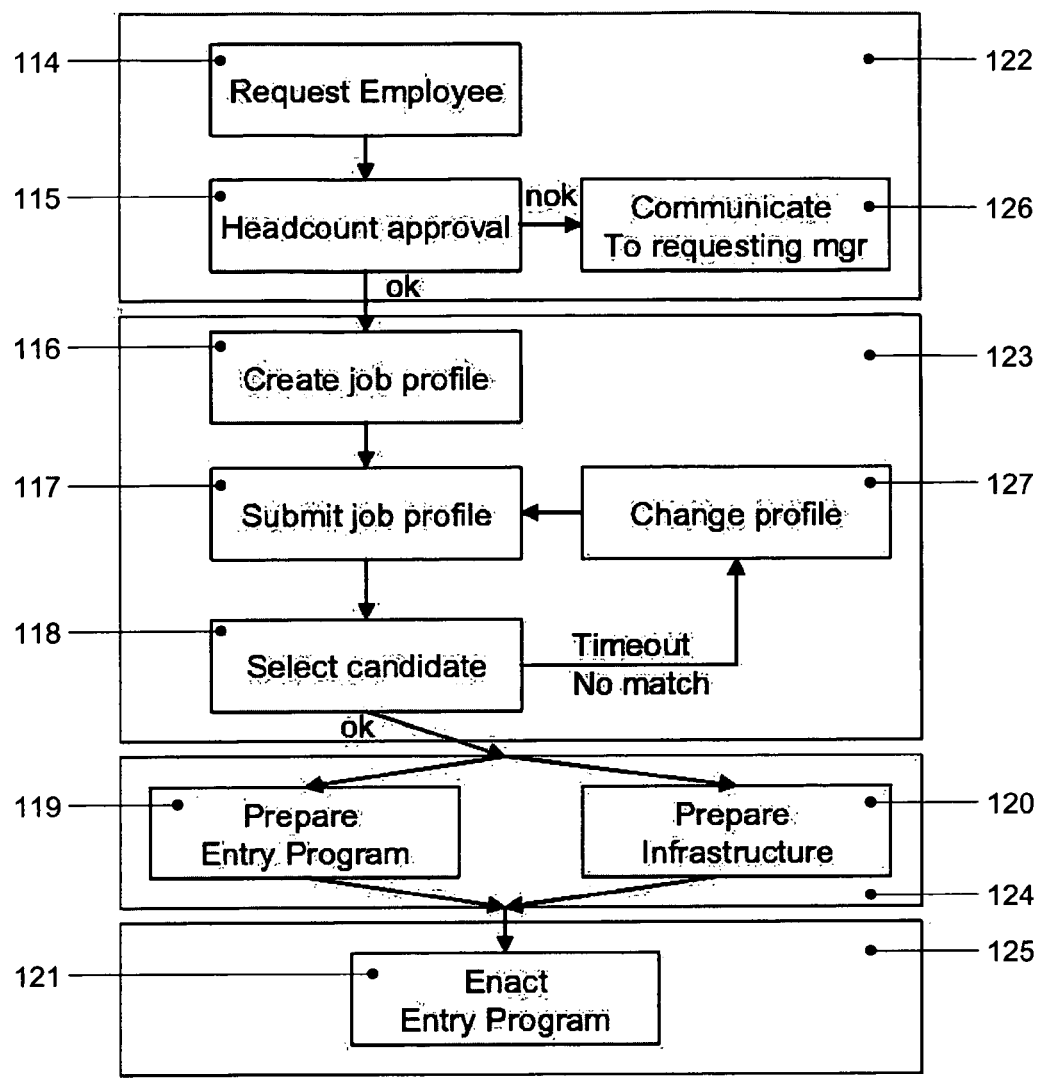
FIG. 6 is a diagram illustrating an action pattern including exception handling.

FIG. 6 illustrates an action pattern including pre-defined exception handling. In order to illustrate the use of action patterns, a simplified version of an employee hiring process is given. This process it used to illustrate ad-hoc workflow issues and exception handling methods. The process includes request employee 114, headcount approval 115, create job profile 116, submit job profile 117, select candidate 118, prepare entry program 119, prepare infrastructure 120 and enact entry program 121. The process can be mapped to the guide procedure framework as follows:

The owner of the process is mapped to the responsible Human Resource (HR) manager and the initiator is mapped to the manager requesting an employee. Additional roles needed during the runtime of the guided procedure are: boss of initiator, HR employee, team members, and candidates. The guided procedure includes four phases: the request phase 122, selection phase 123, prepare phase 124 and employee introduction phase 125. At design time, the following exceptions are identified: headcount approval might fail, select candidate might fail or timeout (long duration). In order to avoid these exceptions, the process includes exception handlers. In particular, an action to communicate to requesting manager 126 if the headcount is not approved and a change profile action 127 if there is a time out or no match for the selection of the candidate. The process shown in FIG. 6 is implemented in the guided procedure framework as follows: the submit job profile step is included in the same phase as the select candidate step in order to avoid reactivation of an already finished phase when the job profiled has to be changed. The process model shown in FIG. 6 does not cover any informal exceptions and communication needs between contributors to this process. In a business situation, there is often not a simple approve vs. not approve but first there is a request for clarification why the manager believes that the candidate for employment is a good fit. There can also be a request for more information if the information provided to the employer is insufficient. There can be negotiation taking place between line manager and HR generalist about appropriate salary level or job title. To address these ad-hoc conversations, an additional layer on top of this process model that supports the execution of pre-defined ad-hoc actions that enable some kind of conversation thread between roles to enable this ad-hoc coordination need.

Figure 7:
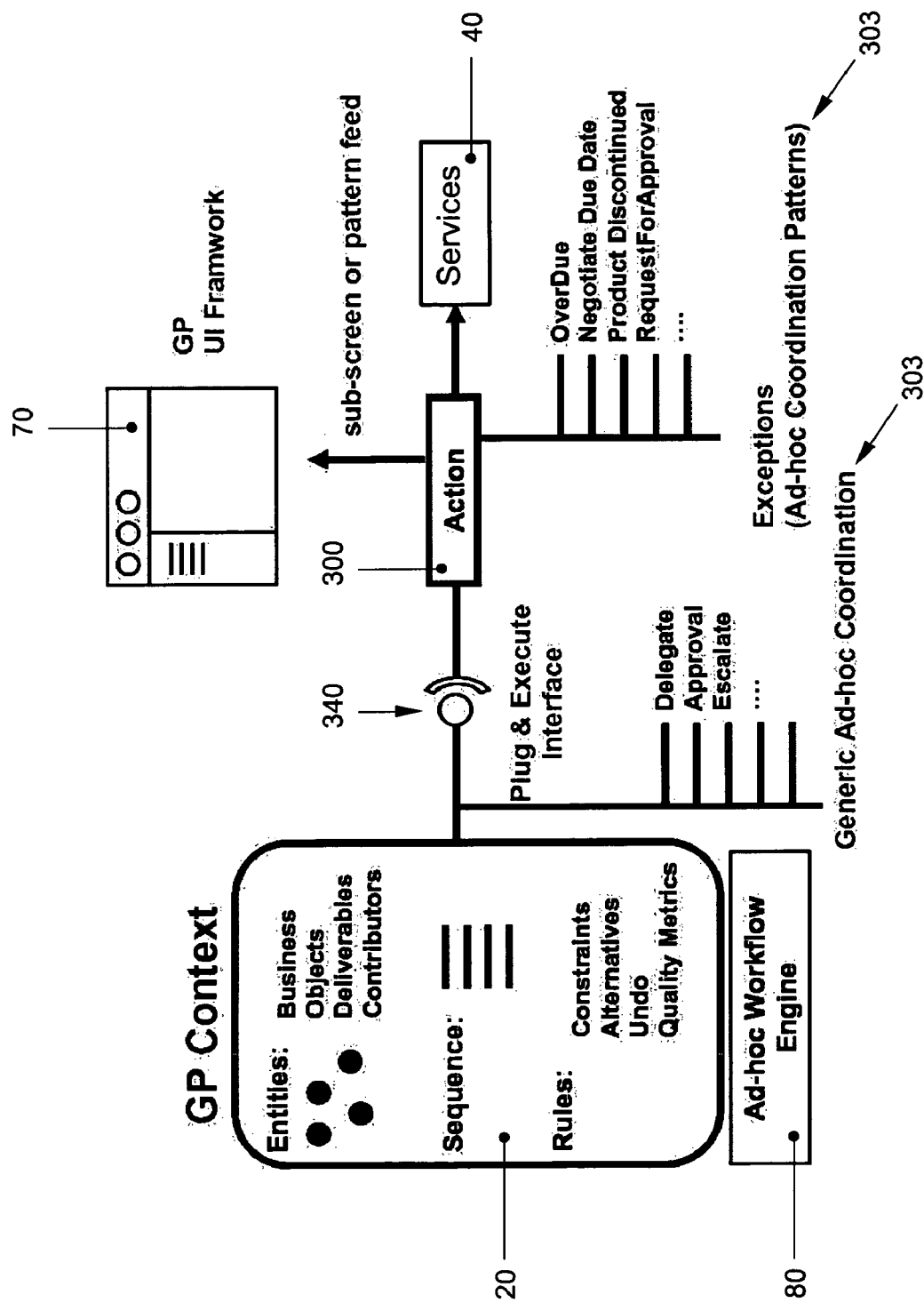
FIG. 7 is a diagram illustrating the concept of an action in a business application.

FIG. 7 shows an action and its connection to a specific work context. An action 300 may include ad-hoc actions, as discussed above. Ad-hoc actions may be generic. Alternatively, they may be specific to a particular action. Ad-hoc actions form ad-hoc workflow. As described, the present invention is concerned with the tracking of ad-hoc actions using an ad-hoc action frame work on a context instance. The ad-hoc framework may be implemented by an ad-hoc workflow engine 80.

An action 300, for example, an ad-hoc action, is instantiated providing an interface 340 to a work context 20. The action 300 activates one or more generic services, preferably web services, wherein a predefined number of data objects are handled in the work context 20. The action 300 may be designed to have a plug & execute interface 340 that may be described as a generic data-interface through which data exchange is possible from the context to the action. In particular, actions are atomic tasks or particular instances of work that a user performs in a given work context 20 or steps that users must execute in a process.

Some generic ad-hoc coordination actions 303 include escalation, request for review, or request for approval and may also be referred to as exception handling actions, or exception handlers per se. System specific generic actions, as exemplified above, typically involve a large number of participants. For example, in the delegation action, a task may be delegated from one participant to a second participant. Several participants may also be involved. The ad-hoc nature of the activity increases as the number of participants increases, since the larger the number of participants the larger the number of possible outcomes and possible processes that lead to the outcomes.

In the user interface 70 a Contextual Action Bar may be provided which supports the display of response options provided by the work item. Those are typically workflow options like "yes", "no", "reject", "reply", "delegate". There are also other task management options provided such as "prioritize", "add to My Lists", "Open related work context", transform into a procedure or ad-hoc Activity, and so forth. System specific generic actions in terms of ad-hoc activity are described in detail below.

Typically in a Guided Procedure project processes are modeled by integrating existing and newly implemented services into a coherent procedure. In this way the workflow as experienced by this user; whether the user is the owner of the process, or at least this part of it; the work objects managed by the process. Guided Procedures support collaboration amongst multiple users all working towards a common goal, each contributing their share. UI elements of the Guided Procedure allow for navigation through the process, indicate the status of the process, and provide different views on the process.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-program product including a computer-readable storage medium having stored thereon instructions for implementing an ad-hoc coordination action framework, extending on a business process framework, the instructions, when executed by a processor resulting in the following:

enabling ad-hoc coordination actions as generic callable services in a work context;

implementing the ad-hoc actions as templates defining state transitions between roles participating at the work context, the ad-hoc actions including request for approval, delegation, escalation, negotiate due date, request for contribution and request for review;

enabling the work context to track state transitions as a conversation thread;

modeling the ad-hoc actions on a basis of one or more state transitions between one or more participants in the one or more actions;

wherein at least one of the ad-hoc actions are a definition of a coordination action between participants, wherein the coordination action has a particular type;

wherein at least one of the ad-hoc actions are modeled on a state transition model that includes substantially all state transitions for the particular type of coordination action; and wherein said substantially all state transitions for the particular type of coordination action defined by the at least one ad-hoc actions modeled by the transition model includes: (i) a first state transition that is associated with a questioning of a reasoning behind a request for approval in the particular type of coordination action defined by the at least one ad-hoc actions modeled by the transition model and (ii) a second state transition that is different from the first state transition and associated with a response to the questioning of the reasoning behind the request for approval in the particular type of coordination action defined by the at least one ad-hoc actions modeled by the transition model.

2. The computer-program product of claim 1 wherein the ad-hoc action framework is enabled as an additional layer in a business application.

3. The computer-program product of claim 1 further comprising tracking the conversation thread in real time.

4. The computer-program product of claim 1 further comprising persisting the ad-hoc actions between the one or more participants in the work context.

5. The computer-program product of claim 4 wherein the ad-hoc actions are enabled in a conversation between the one or more participants.

6. The computer-program product of claim 1 further comprising instantiating an ad-hoc conversation including one or more ad-hoc actions between one or more participants within the work context.

7. The computer-program product of claim 1 wherein at least one of the ad-hoc actions are at least one of a generic ad-hoc action and an action specific ad-hoc action.

8. The computer-program product of claim 1 further comprising encapsulating the state transition models as long-running actions on a business application.

9. The computer-program product of claim 8 further comprising instantiating the long-running actions within an instantiated context of a business application.

10. The computer-program product of claim 9 further comprising, when launching the long-running actions, combining the long-running actions with an existing contextual role.

11. The computer-program product of claim 8 further comprising, when launching the long-running actions, adding a new participant to the instantiated context.

12. The computer-program product of claim 1 further comprising pre-enabling a combination of at least one of the ad-hoc actions with a particular instantiated context in accordance with a common work practice.

13. The computer-program product of claim 1 wherein the ad-hoc actions comprise a definition of at least one a request action, a promise action and a negotiate action.

14. The computer-program product of claim 2 wherein the additional layer is modeled by ad-hoc coordination actions on the basis of one or more state transitions models that define the ad-hoc interaction among participants in a given context.

15. The computer-program product of claim 1 wherein the execution of one or more of the ad-hoc actions freezes a work flow instance in the business process framework.

16. The computer-program product of claim 1 wherein the exception handling mechanism is embedded within a guided procedure framework upon which the ad-hoc coordination action framework is disposed.

17. The computer-program product of claim 7 wherein at least one of the ad-hoc actions is an action specific ad-hoc action.

18. A computer-implemented method for implementing an ad-hoc coordination action framework, extending on a business process framework, the method comprising:
    enabling, by a computer, ad-hoc coordination actions as generic callable services in a work context;
    implementing, by the computer, the ad-hoc actions as templates defining state transitions between roles participating at the work context, the ad-hoc actions including request for approval, delegation, escalation, negotiate due date, request for contribution and request for review;
    enabling, by the computer, the work context to track state transitions as a conversation thread;
    modeling, by the computer, the ad-hoc actions on a basis of one or more state transitions between one or more participants in the one or more actions;
    wherein at least one of the ad-hoc actions are a definition of a coordination action between participants, wherein the coordination action has a particular type;
    wherein at least one of the ad-hoc actions are modeled on a state transition model that includes substantially all state transitions for the particular type of coordination action; and
    wherein said substantially all state transitions for the particular type of coordination action defined by the at least one ad-hoc actions modeled by the transition model includes: (i) a first state transition that is associated with a questioning of a reasoning behind a request for approval in the particular type of coordination action defined by the at least one ad-hoc actions modeled by the transition model and (ii) a second state transition that is different from the first state transition and associated with a response to the questioning of the reasoning behind the request for approval in the particular type of coordination action defined by the at least one ad-hoc actions modeled by the transition model.

19. Apparatus for implementing an ad-hoc coordination action framework, extending on a business process framework, the apparatus comprising:
    a computer-implemented to:
        enable ad-hoc coordination actions as generic callable services in a work context;
        implement the ad-hoc actions as templates defining state transitions between roles participating at the work context, the ad-hoc actions including request for approval, delegation, escalation, negotiate due date, request for contribution and request for review;
        enable the work context to track state transitions as a conversation thread;
        model the ad-hoc actions on a basis of one or more state transitions between one or more participants in the one or more actions;
        wherein at least one of the ad-hoc actions are a definition of a coordination action between participants, wherein the coordination action has a particular type;
        wherein at least one of the ad-hoc actions are modeled on a state transition model that includes substantially all state transitions for the particular type of coordination action; and
        wherein said substantially all state transitions for the particular type of coordination action defined by the at least one ad-hoc actions modeled by the transition model includes: (i) a first state transition that is associated with a questioning of a reasoning behind a request for approval in the particular type of coordination action defined by the at least one ad-hoc actions modeled by the transition model and (ii) a second state transition that is different from the first state transition and associated with a response to the questioning of the reasoning behind the request for approval in the particular type of coordination action defined by the at least one ad-hoc actions modeled by the transition model.

* * * * *